(12) United States Patent
Yamamoto et al.

(10) Patent No.: US 6,552,099 B2
(45) Date of Patent: Apr. 22, 2003

(54) MODIFIED FLUORORESIN AND PROCESS FOR PRODUCING THE SAME

(75) Inventors: Yasuaki Yamamoto, Ibaraki (JP); Hiroo Kusano, Ibaraki (JP); Hideki Yagyu, Ibaraki (JP); Hajime Nishi, Ibaraki (JP)

(73) Assignee: Hitachi Cable, Ltd, Tokyo (JP)

( * ) Notice: Subject to any disclaimer, the term of this patent is extended or adjusted under 35 U.S.C. 154(b) by 42 days.

(21) Appl. No.: 09/879,246

(22) Filed: Jun. 8, 2001

(65) Prior Publication Data

US 2003/0008935 A1 Jan. 9, 2003

(51) Int. Cl.$^7$ ............... C08J 3/28; C08L 23/00; C08F 8/00
(52) U.S. Cl. ............ 522/156; 522/150; 522/155; 525/192; 525/193; 525/326.2
(58) Field of Search ............... 522/150, 155, 522/156; 525/192, 193, 326.2

(56) References Cited

U.S. PATENT DOCUMENTS

| | | | | |
|---|---|---|---|---|
| 3,700,609 A | * | 10/1972 | Tregear et al. .............. 435/181 |
| 3,718,558 A | * | 2/1973 | Tabata et al. ................ 522/156 |
| 4,277,586 A | * | 7/1981 | Ukihashi et al. ............. 522/156 |
| 5,444,103 A | * | 8/1995 | Tabata et al. ................ 522/156 |

* cited by examiner

*Primary Examiner*—Nathan M. Nutter
(74) *Attorney, Agent, or Firm*—Antonelli, Terry, Stout & Kraus, LLP

(57) ABSTRACT

A fluororesin heated at a temperature at or above the melting point of the resin is exposed in an inert gas atmosphere having an oxygen concentration of not more than 10 Torr to an ionizing radiation at a radiation dose of 0.1 kGy to 10 MGy to prepare a crosslinked fluororesin. The crosslinked fluororesin is exposed to an ionizing radiation at a radiation dose of 10 kGy to 5 MGy, and is then brought into contact with a functional group-containing organic compound to cause a graft reaction. By virtue of this constitution, a modified fluororesin is provided which has satisfactory mechanical strength and, at the same time, has, imparted thereto, for example, ion-exchange capacity, hydrophilicity, adhesive property, or abrasion resistance.

19 Claims, No Drawings

MODIFIED FLUORORESIN AND PROCESS FOR PRODUCING THE SAME

FIELD OF THE INVENTION

The invention relates to a modified fluororesin comprising a functional group-containing organic compound grafted onto the surface of a crosslinked fluororesin, and more particularly to a modified fluororesin which has been improved in ion-exchange property, hydrophilicity, adhesive property, abrasion resistance or other properties by graft copolymerizing a specific side-chain monomer onto a backbone polymer in a crosslinked fluororesin.

BACKGROUND OF THE INVENTION

Among fluororesins, tetrafluoroethylene polymers (hereinafter referred to as "PTFE"), tetrafluoroethylene-perfluoro (alkyl vinyl ether) copolymers (hereinafter referred to as "PFA"), and tetrafluoroethylene-hexafluoropropylene copolymers (hereinafter referred to as "FEP") are known as radiation-degradable resins. The mechanical strength of these resins is known to be significantly lowered upon exposure to a very small quantity of an ionizing radiation to such an extent that the resins no longer can be used as materials. For example, in the case of PTFE, upon exposure to a γ radiation in air at a radiation dose of 5 kGy, the mechanical strength at break is reduced to not more than 10 MPa and the elongation is reduced to not more than 100%, and, upon exposure to the γ radiation in vacuo at a radiation dose of 15 kGy, the mechanical strength at break is reduced to not more than 15 MPa and the elongation is reduced to not more than 100%.

In general, grafted resins cannot be put to practical use when resins used as the base have low mechanical strength. Therefore, when a functional group-containing radiation-graftable organic compound (a functional monomer) is grafted onto the above fluororesins by the application of an ionizing radiation, the mechanical strength of the resins is lowered unless a graft reaction takes place at a very low radiation dose of about 10 kGy. Thus, in the conventional radiation grafting of fluororesins, the mechanical strength of the resin is incompatible with the graft level of the functional organic compound. That is, when the radiation dose is decreased, the graft reaction becomes unsatisfactory and, consequently, the properties of the functional group cannot be satisfactorily provided. On the other hand, when the radiation dose is increased to a level which causes a satisfactory graft reaction, the mechanical strength and elongation of the fluororesin as the base resin are lowered, and, consequently, the grafted fluororesin cannot be put to practical use.

SUMMARY OF THE INVENTION

Accordingly, it is an object of the invention to provide a modified fluororesin which has satisfactory mechanical strength and, at the same time, has, imparted thereto, for example, satisfactory ion-exchange capacity, hydrophilicity, adhesive property, or abrasion resistance, and a process for producing the same.

According to the first feature of the invention, a modified fluororesin comprises: a crosslinked fluororesin produced by exposing a fluororesin at a temperature at or above the melting point of the resin to an ionizing radiation to crosslink the fluororesin; and a functional group-containing organic compound which has been grafted onto the crosslinked fluororesin by ionizing radiation irradiation. Thus, the modified fluororesin according to the invention comprises a functional group-containing organic compound which has been radiation grafted onto a crosslinked fluororesin. In the modified fluororesin according to the invention, various properties could have been imparted to the fluororesin without sacrificing the mechanical properties of the fluororesin, and a tensile strength at break of not less than 10 MPa and an elongation of not less than 50% can be realized. Here the tensile strength at break and the elongation were measured according to JIS K 7161 using an IA-type test piece specified in JIS K 7162 at a tensile speed of 200 mm/min.

According to the second feature of the invention, a process for producing a modified fluororesin comprises the steps of: exposing a fluororesin heated at a temperature at or above the melting point of the resin in an inert gas atmosphere having an oxygen concentration of not more than 10 Torr to an ionizing radiation at a radiation dose of 0.1 kGy to 10 MGy to prepare a crosslinked fluororesin; exposing the crosslinked fluororesin to an ionizing radiation at a radiation dose of 10 kGy to 5 MGy; and then bringing the crosslinked fluororesin into contact with a functional group-containing organic compound to cause a graft reaction.

According to the third feature of the invention, a process for producing a modified fluororesin comprises the steps of: exposing a fluororesin heated at a temperature at or above the melting point of the resin in an inert gas atmosphere having an oxygen concentration of not more than 10 Torr to an ionizing radiation at a radiation dose of 0.1 kGy to 10 MGy to prepare a crosslinked fluororesin; and exposing the crosslinked fluororesin to an ionizing radiation at a radiation dose of 10 kGy to 5 MGy in the presence of a functional group-containing organic compound to cause a graft reaction.

DESCRIPTION OF THE PREFERRED EMBODIMENTS

Preferred embodiments of the invention will be described. The above-described PTFE, PFA, and FEP may be mentioned as fluororesins usable in the invention. The form of the fluororesin is not particularly limited, and examples thereof include particles, sheets, films, blocks, and fibers. Further, a laminate or a composite formed of two or more of these materials or a laminate or a composite formed of at least one of these materials and other material(s) may also be used.

The above-described PTFE embraces those containing not more than 1% by mole of polymer units based on a comonomer, such as perfluoro(alkyl vinyl ether), hexafluoropropylene, (perfluoroalkyl)ethylene, or chlorotrifluoroethylene. In the case of the fluororesin in a copolymer form, a minor amount of a third component may be contained in the molecular structure.

The crosslinked fluororesin according to the invention may be produced by exposing a fluororesin heated at a temperature at or above the melting point of the fluororesin in an inert gas atmosphere having an oxygen concentration of not more than 10 Torr to an ionizing radiation at a radiation dose of 0.1 kGy to 10 MGy. When the oxygen concentration of the atmosphere exceeds 10 Torr, the crosslinking effect is unsatisfactory. When the radiation dose of the ionizing radiation is less than 0.1 kGy, the crosslinking effect is unsatisfactory, while when the radiation dose exceeds 10 MGy, the elongation or the like is significantly lowered. The crosslinked fluororesin may be produced by exposing a sheet or a block of a fluororesin to an ionizing radiation. Alternatively, the crosslinked fluororesin may be produced by molding a fluororesin powder, which has been exposed to an ionizing radiation, for example, by compression molding into a sheet or a block.

Ionizing radiations usable in crosslinking the fluororesin include γ radiation, electron beams, X radiation, neutrons, and high energy ions. In applying the ionizing radiation, the fluororesin should be previously heated at a temperature at or above the crystalline melting point of the fluororesin. For example, when PTFE is used as the fluororesin, the fluororesin should be exposed to an ionizing radiation in such a state that the fluororesin has been heated to a temperature of 327° C. (the crystalline melting point of this material) or above. When PFA is used, this fluororesin is exposed to an ionizing radiation in such a state that the fluororesin has been heated to a temperature of 310° C. (the crystalline melting point of this material) or above. When FEP is used, this fluororesin is exposed to an ionizing radiation in such a state that the fluororesin has been heated to a temperature of 275° C. (the crystalline melting point of this material) or above. Heating the fluororesin at a temperature at or above the melting point of the fluororesin can energize the molecular motion of the backbone constituting the fluororesin and consequently can efficiently accelerate an intermolecular crosslinking reaction. Excessive heating causes cleavage and decomposition of the molecular backbone. The G upper limit of the heating temperature should be 10 to 30° C. above the melting point of the fluororesin from the viewpoint of inhibiting the occurrence of this depolymerization phenomenon.

The modified fluororesin according to the invention may be produced by grafting a functional group-containing organic compound onto the above crosslinked fluororesin by the application of an ionizing radiation. Grafting methods using a radiation are classified into a pre-irradiation method, wherein a radiation is previously applied to the backbone polymer of the fluororesin to produce radicals as an origin of grafting and the fluororesin is then brought into contact with a functional group-containing organic compound, and a simultaneous irradiation method wherein an ionizing radiation is applied to the fluororesin in the presence of the functional group-containing organic compound. Any of these methods may be used in the invention.

Ionizing radiations usable herein include radiations or ions of not less than 100 keV, such as γ radiation, electron beams, X radiation, and protons, which can permeate the fluororesin by 10 to 100 μm or more. High-energy plasma may also be used. The radiation dose of the ionizing radiation is preferably 10 kGy to 5 MGy. When the radiation dose is less than 10 kGy, the effect of a graft reaction on a level such that the properties of the functional group can be effectively allowed to function, is less likely to be attained. On the other hand, when the radiation dose exceeds 5 MGy, the elongation or the like is likely to be significantly lowered. When the temperature at the time of the ionizing radiation irradiation is high, the disappearance of radicals takes place. Therefore, the temperature at the time of the ionizing radiation irradiation is preferably room temperature or below. The application of the ionizing radiation may be carried out in an inert gas atmosphere, or alternatively may be carried out in the presence of oxygen.

The functional group-containing organic compound to be graft polymerized onto the crosslinked fluororesin may be properly selected according to the properties to be imparted to the fluororesin. For example, when imparting the ion-exchange capacity is contemplated, an organic compound containing a phenolic hydroxyl group, a carboxylic acid group, an amino group, a sulfonic acid group or the like is used. Further, an acyloxy group, an ester group, and an acid imide group can be quantitatively converted to a phenolic hydroxyl group, a sulfonic acid group or the like by hydrolyzing the grafted product. Therefore, organic compounds containing these functional groups may also be used when imparting the ion-exchange capacity to the fluororesin is contemplated. Specific examples of organic compounds having an ion-exchange functional group include organic compounds having an ion-exchange functional group, such as hydroxystyrene, acyloxystyrene, acrylic ester, methacrylic ester, maleic ester, fumaric ester, vinylester, a vinylamine compound, vinylpyridine, vinylsuccinimide, and vinylsulfonic ester.

In the case of acyloxystyrene, a substituent may be located at the o-, m-, or p-position, and the hydrocarbon group contained in the acyl group is preferably a straight-chain or branched aliphatic, alicyclic, or aromatic hydrocarbon having 1 to 15 carbon atoms. p-Acetoxystyrene is most commonly used. In the case of esters such as acrylic esters and methacrylic esters, the hydrocarbon group contained in the ester group is preferably a straight-chain or branched aliphatic, alicyclic, or aromatic hydrocarbon group having 1 to 20 carbon atoms.

Organic compounds usable in imparting hydrophilicity include hydroxystyrene, 2-hydroxymethyl methacrylate, 2-hydroxyethyl methacrylate, vinylamine compounds, vinylsuccinimide, vinylsulfonic acid, and vinyl alcohol. The contact angle of water on PTFE is generally 100 degrees. On the other hand, the contact angle of water on the modified PTFE, to which hydrophilicity has been imparted according to the invention, has been found to be in the range of 10 to 80 degrees, indicating that a very high level of hydrophilicity was imparted.

Organic compounds usable in imparting an adhesive property include glycidyl acrylate, glycidyl methacrylate, allyl glycidyl ether, vinyl-containing carbamic ester, and acrylonitrile. When the adhesive property has been imparted in this way, the fluororesin can be easily adhered to metals and other plastics. In this case, suitable metals include stainless steel, steel, aluminum, chromium, nickel, iron, tin, zinc, lead, and manganese. Preferably, these metals are previously subjected to conventional surface treatment, for example, oxidation using an acid solution. However, the modified fluororesin can also be adhered to metals not subjected to the surface treatment. Suitable plastics include polyolefins, such as polyethylene and polypropylene, acetate, vinyl chloride, polystyrene, polyester, polycarbonate, and polyamide.

Organic compounds usable in imparting abrasion resistance include vinylsiloxane, chlorotrifluoroethylene, vinyl chloride, vinylidene chloride, fluorostyrene, and chlorostyrene.

The functional group-containing organic compound may be dissolved in an organic solvent to prepare a solution which is then used in the radiation graft reaction. This organic solvent is preferably one which can homogeneously dissolve the organic compound and does not dissolve the fluororesin. Examples of organic solvents usable herein include: ketones, such as acetone and methyl ethyl ketone; esters, such as ethyl acetate and butyl acetate; alcohols, such as methyl alcohol, ethyl alcohol, propyl alcohol, and butyl alcohol; ethers, such as tetrahydrofuran and dioxane; aromatic hydrocarbons, such as N,N-dimethylformamide, N,N-dimethyl acetamide, benzene, and toluene; aliphatic or alicyclic hydrocarbons, such as n-heptane and cyclohexane; and a mixed solvent composed of two or more of the above organic solvents. Among them, organic solvents, which can swell the crosslinked fluororesin, are preferred.

After the radiation graft reaction, the crosslinked fluororesin may be optionally washed with an organic solvent. Examples of organic solvents usable herein include: alcohols, such as methanol, ethanol, and propyl alcohol; ketones, such as acetone and methyl ethyl ketone; aromatic hydrocarbons, such as benzene and toluene; and a mixture of two or more of the above organic solvents.

When the modified fluororesin is used as an ion-exchange membrane, for example, the acyloxy or ester group as the functional group should be converted by hydrolysis to a hydroxyl group or an acid group. As with the conventional hydrolysis of acyl or ester group commonly carried out in the art, this hydrolysis is very easy as compared with the hydrolysis of the primary alcohol ester, and can be easily carried out under mild conditions. Specifically, an acid or a base is provided as a catalyst, and the grafted crosslinked fluororesin is placed in an aqueous solution containing the catalyst or a mixed solution, composed of water and a water-soluble organic solvent, containing the catalyst to cause the hydrolysis reaction. Since the hydrolysis reaction is mainly carried out in a heterogeneous system, the hydrolysis is preferably carried out in a mixture of a water-soluble organic solvent, such as an alcohol or a ketone, with water from the viewpoints of enhancing the affinity of the reactive group for the catalyst and, when an acid catalyst is used, permitting a left organic acid to be dissolved. The temperature of the hydrolysis is suitably 50 to 100° C.

According to the invention, the modified fluororesin may be in the form of a sheet, a film, a block, or a fiber as a molded product of the modified fluororesin per se. Alternatively, the modified fluororesin may be in the form of a sheet, a film, a block, or a fiber as a molded product of a compound of the modified fluororesin with other polymer incorporated therein. Other polymers usable herein include unmodified fluororesins, such as unmodified PTFE, unmodified PFA, and unmodified FEP, engineering plastics, such as polyether sulfone and polyimide, and thermoplastic resins, such as polyethylene and polypropylene.

EXAMPLES

Example 1

A 0.5 mm-thick PTFE film (21 g) was exposed in a nitrogen (800 Torr) gas atmosphere having an oxygen concentration of 0.5 Torr at a heating temperature of 340° C. to an electron beam (acceleration voltage: 2 MeV) at a radiation dose of 300 kGy to prepare a crosslinked PTFE film. In this case, the melting point and the crystallization temperature of PTFE film were measured with a scanning differential calorimeter before and after the crosslinking. As a result, the uncrosslinked PTFE film had a melting point of 330° C. and a crystallization temperature of 310° C., while the crosslinked PTFE film had a melting point of 305° C. and a crystallization temperature of 277° C. The amount of the residual radical in the crosslinked PTFE film was measured with an electron spin resonance device. As a result, it was found that there was no residual radical.

Next, 100 ml of a solution composed of 50% by weight of p-acetoxystyrene and 50% by weight of benzene was placed in one ampoule in an H-type glass ampoule, and was degassed by repeating freezing and thawing in vacuo. On the other hand, 7.5 g of the crosslinked PTFE film was exposed in nitrogen gas at room temperature an electron beam (acceleration voltage 2 MeV, current 2.8 mA) at a radiation dose of 500 kGy, and was then placed in the other glass ampoule in an inert gas, followed by evacuation to a vacuum of about $10^{-3}$ Torr. Thereafter, the p-acetoxystyrene-containing frozen product was thawed and transferred to the crosslinked PTFE film side, and a reaction was allowed to proceed at 60° C. for 2 hr. After the reaction, the ampoule was opened, and the PTFE film was taken out of the ampoule, was washed with benzene and then with acetone, and was then dried in vacuo. The degree of grafting was 30% as determined from the difference in weight between before the reaction and after the reaction of the PTFE film. The repetition of the extraction of this film with acetone did not cause any weight change.

The grafted crosslinked PTFE film was placed in a flask equipped with a cooling tube, and 100 ml of a 1:4 (volume ratio) mixture of concentrated hydrochloric acid and methanol was added thereto, followed by heating in a hot bath for 30 min. An infrared absorption spectrum of the crosslinked PTFE film revealed the complete hydrolysis of the ester group, and had a new absorption peak derived from a phenolic hydroxyl group. The crosslinked PTFE film as an ion-exchange membrane had an exchange capacity of 3.5 meV/g and an electric resistance of 20 $\Omega \cdot cm^2$ in an aqueous 40% NaOH solution. The grafted, crosslinked PTFE film had a tensile strength at break of 18 MPa and an elongation of 150%.

Comparative Example 1

A 0.5 mm-thick uncrosslinked PTFE film was subjected to grafting by ionizing radiation irradiation in the same manner as in Example 1. The grafted PTFE film had a tensile strength at break of not more than 5 MPa and an elongation of not more than 50% and thus was very fragile and unusable.

Example 2

A 0.5 mm-thick PTFE film (21 g) was exposed to an electron beam in the same manner as in Example 1 to prepare a crosslinked PTFE film. This crosslinked PTFE film was exposed in air at room temperature to an electron beam at a radiation dose of 30 kGy to perform pretreatment for grafting.

Next, 100 ml of a solution composed of 50% by weight of p-acetoxystyrene and 50% by weight of benzene was placed in one ampoule in an H-type glass ampoule, and was degassed by repeating freezing and thawing in vacuo. On the other hand, the crosslinked PTFE film, which had been pretreated for grafting, was placed in the other glass ampoule in a nitrogen gas, followed by evacuation to a vacuum of about $10^{-3}$ Torr. Thereafter, the p-acetoxystyrene-containing frozen product was thawed and transferred to the crosslinked PTFE film side, and a reaction was allowed to proceed at 100° C. for 2 hr. After the reaction, the ampoule was opened, and the PTFE film was taken out of the ampoule, washed with benzene and then with acetone, and was then dried in vacuo. The degree of grafting was 30% as determined from the difference in weight between before the reaction and after the reaction of the PTFE film. The repetition of the extraction of this film with acetone did not cause any weight change.

The grafted crosslinked PTFE film was placed in a flask equipped with a cooling tube, and 100 ml of a 1:4 (volume ratio) mixture of concentrated hydrochloric acid and methanol was added thereto, followed by heating in a hot bath for 30 min. An infrared absorption spectrum of the crosslinked PTFE film revealed the complete hydrolysis of the ester group, and had a new absorption peak derived from a phenolic hydroxyl group. The crosslinked PTFE film as an ion-exchange membrane had an exchange capacity of 3.0 meV/g and an electric resistance of 20 Ω·cm$^2$ in an aqueous 40% NaOH solution. The grafted, crosslinked PTFE film had a tensile strength at break of 13 MPa and an elongation of 200%.

Example 3

A 0.5 mm-thick PTFE film having a size of about 20 cm×10 cm) (21 g) was exposed in a nitrogen (800 Torr) gas atmosphere having an oxygen concentration of 0.5 Torr at a heating temperature of 330° C. to an electron beam (acceleration voltage: 2 MeV) at a radiation dose of 100 kGy to prepare a crosslinked PTFE film. This crosslinked PTFE film was heated in a nitrogen gas atmosphere at a temperature of 50° C. or above for not less than 50 hr, and the substantially complete disappearance of the residual radical was confirmed by an electron spin resonance device.

The crosslinked PTFE film was cut into a strip having a size of 2 cm×10 cm which was then exposed in a nitrogen gas at room temperature to an electron beam (acceleration voltage 2 MeV, current 2.9 mA) at a radiation dose of 500 kGy. This sample was placed in a glass ampoule in an inert gas, followed by evacuation to a vacuum. Vapor produced by heating glycidyl methacrylate at 80° C. was introduced through a greaseless cock from one ampoule to allow a reaction to proceed for about 15 min, thereby performing grafting. After the reaction, the ampoule was opened, and the PTFE film was taken out of the ampoule, washed with acetone, and was then dried in vacuo. The degree of grafting was 32% as determined from the difference in weight between before the reaction and after the reaction of the PTFE film. The repetition of the extraction of this film with acetone did not cause any weight change. A total reflection infrared absorption spectrum of this grafted, crosslinked PTFE film was analyzed. As a result, a peak derived from an ester bond was observed at 1730 cm$^{-1}$. The grafted crosslinked PTFE film had a tensile strength at break of 17 MPa and an elongation of 180%.

The grafted, crosslinked PTFE film was heat pressed against and bonded to two stainless steel foils (SUS 304, thickness 50 μm), one of which had been degreased and the other had been degreased followed by acid treatment, under conditions of heating temperature 280° C., pressing pressure 15 kg/cm$^2$, and heating time 5 min to prepare composite films.

Example 4

A grafted, crosslinked PTFE film was prepared in the same manner as in Example 3, except that, in graft treatment of the crosslinked PTFE film, the electron beam was applied at room temperature in air at a radiation dose of 50 kGy. This grafted, crosslinked PTFE film was bonded to a stainless steel foil in the same manner as in Example 3 to prepare a composite film.

Comparative Example 2

A 0.5 mm-thick uncrosslinked PTFE film was subjected to grafting by ionizing radiation irradiation in the same manner as in Example 3. The grafted PTFE film was bonded to a stainless steel foil in the same manner as in Example 2 to prepare a composite film.

Comparative Example 3

A 0.5 mm-thick PTFE film was subjected to grafting by exposure to an ionizing radiation at a radiation dose of 10 kGy in the same manner as in Example 1. The grafted PTFE film was bonded to a stainless steel foil in the same manner as in Example 3 to prepare a composite film.

To examine the adhesion between the PTFE film and the stainless steel in the composite films prepared in Examples 3 and 4 and Comparative Examples 2 and 3, the adhesive strength was measured by a 180-degree peel test, and, after bending at 180 degrees of the composite film, the film was visually inspected. The results are shown in Table 1. In the measurement of the adhesive strength, the composite film was cut to a width of 10 mm, and the adhesive strength was then measured by the peel test under conditions of tensile speed of 200 mm/min and measurement temperature 20° C.

TABLE 1

| | 180-Degree adhesive strength, kg/cm | | Visual inspection after 180-dgree bending | |
|---|---|---|---|---|
| | Degreasing[1] | Degreasing followed by acid treatment[2] | Degreasing[1] | Degreasing followed by acid treatment[2] |
| Ex. 3 | 2.5 | 2.7 | Neither separation nor cracking of PTFE occurred | Neither separation nor cracking of PTFE occurred |
| Ex. 4 | 2.0 | 2.3 | Neither separation nor cracking of PTFE occurred | Neither separation nor cracking of PTFE occurred |
| Comp. Ex. 2 | Immeasurable due to low strength of PTFE | Immeasurable due to low strength of PTFE | Separation of PTFE from stainless steel and cracking of PTFE occurred | Separation of PTFE from stainless steel and cracking of PTFE occurred |
| Comp. Ex. 3 | Immeasurable due to low strength of PTFE | Immeasurable due to low strength of PTFE | Separation of PTFE from stainless steel occurred | Separation of PTFE from stainless steel occurred |

[1]The stainless steel was washed with acetone followed by air drying.
[2]The stainless steel was washed with acetone, was immersed in an etching solution at 20° C. (composed of 20% by weight of hydrochloric acid, 5% by weight of nitric acid, 5% by weight of phosphoric acid, and 70% by weight of purified water) for 30 sec, was washed with water, and was then air dried.

Example 5

A 0.5 mm-thick PTFE film was exposed in a nitrogen (800 Torr) gas atmosphere having an oxygen concentration of 0.5 Torr at a heating temperature of 340° C. to an electron beam (acceleration voltage: 2 MeV) at a radiation dose of 100 kGy to prepare a crosslinked PTFE film. The crosslinked PTFE film had a melting point of 315° C. and a crystallization temperature of 290° C.

One side of this crosslinked PTFE film was subjected to discharge treatment at a treatment speed of 20 m/min under an argon gas of 0.1 Torr using a high-pressure power supply of synchronization-type automatic oscillation system (4 kW, 100 kHz). The treated crosslinked PTFE film was then brought into contact with a solution composed of 5 g of diglycidyl methacrylate and 95 g of tetrahydrofuran, followed by drying in vacuo. This film was then exposed in a nitrogen gas atmosphere at room temperature to an electron beam (acceleration voltage 2 MeV) at a radiation dose of 15 kGy to allow a graft reaction to proceed. The grafted, crosslinked PTFE film had a tensile strength at break of 20 MPa and an elongation of 200%.

An epoxy adhesive ECCOBOND 55 (ABLE STIK (JAPAN) Co., Ltd.) and a catalyst CATALYST 9 (ABLE STIK (JAPAN) Co., Ltd.) were mixed together in a ratio of 100:12. The mixture was then coated on the crosslinked PTFE film in its grafted surface to a thickness of 10 μm. The coated film was then laminated onto an aluminum plate, followed by press bonding at a pressing pressure of 0.1 MPa for 12 hr.

Comparative Example 4

A 0.5 mm-thick PTFE film was crosslinked in the same manner as in Example 5. The crosslinked PTFE film was then laminated to an aluminum plate in the same manner as in Example 3, except that the graft reaction was not carried out.

The samples prepared in Example 5 and Comparative Example 4 were measured for the adhesive strength by a 180-degree peel test. As a result, the adhesive strength was 3 kg/cm for the sample prepared in Example 5, and was 0.5 kg/cm for the sample prepared in Comparative Example 4. In the measurement of the adhesive strength, the composite film was cut to a width of 10 mm, and the adhesive strength was then measured by the peel test under conditions of tensile speed of 200 mm/min and measurement temperature 20° C.

Example 6

A crosslinked PTFE film was prepared in the same manner as in Example 3. The crosslinked PTFE film was then cut into a square having a size of 2 cm×2 cm. This was then exposed in a nitrogen gas at room temperature to an electron beam (acceleration voltage 2 MeV, current 2.9 mA) at a radiation dose of 50 kGy. Next, 100 ml of a mixed solution composed of equal amounts of hydroxyethyl methacrylate and methanol was placed in one ampoule in an H-type glass ampoule, and was degassed by repeating freezing and thawing in vacuo. On the other hand, the crosslinked PTFE film was then placed in the other glass ampoule in an inert gas, followed by evacuation to a vacuum of about $10^{-3}$ Torr and heat sealing. Thereafter, the frozen product was thawed and transferred to the crosslinked PTFE film side, and a reaction was allowed to proceed at 60° C. for one hr. After the reaction, the ampoule was opened, and the crosslinked PTFE film was taken out of the ampoule, washed with methanol and then with acetone, and was then dried in vacuo. The degree of grafting was 35% as determined from the difference in weight between before the reaction and after the reaction of the film. The repetition of the extraction of this film with acetone did not cause any weight change.

Example 7

Grafting was carried out in the same manner as in Example 6, except that, in graft treatment of the crosslinked PTFE film, the electron beam was applied at room temperature in air at a radiation dose of 100 kGy. This grafted, crosslinked PTFE film was then treated in the same manner as in Example 6.

Comparative Example 5

An uncrosslinked PTFE film (2 cm×2 cm) was subjected to grafting treatment by exposure to an ionizing radiation in the same manner as in Example 6. After the graft treatment, the film was treated in the same manner as in Example 6.

Comparative Example 6

An uncrosslinked PTFE film (2 cm×2 cm) was subjected to grafting treatment by exposure to an ionizing radiation at a radiation dose of 5 kGy in the same manner as in Example 4. After the graft treatment, the film was treated in the same manner as in Example 4.

The contact angle of water on the grafted PTFE films prepared in Examples 6 and 7 and Comparative Examples 5 and 6 was measured. The results are shown in Table 2. The contact angle was measured as follows. The surface of the PTFE film was cleaned with ethanol, and was then dried. About 0.1 ml of ion-exchanged water was dropped on the surface of the film at 25° C. through a syringe. Five seconds after the dropping of the ion-exchanged water, the contact angle of water on the film was measured by observation under a microscope (magnification: 10 times). Further, after 180-degree bending, the grafted PTFE film was visually inspected. The results are also shown in Table 2.

TABLE 2

|  | Contact angle of water at 25° | State after 180-degree bending |
|---|---|---|
| Ex. 6 | 20° | Not broken |
| Ex. 7 | 25° | Not broken |
| Comp. Ex. 5 | 90° | Not broken |
| Comp. Ex. 6 | 80° | Broken |

As is also apparent from the comparison of the examples with the comparative examples, the invention can realize a modified fluororesin which has satisfactory mechanical strength and, at the same time, has, imparted thereto, for example, satisfactory ion-exchange capacity, hydrophilicity, adhesive property, or abrasion resistance. Thus, the invention can greatly contribute to expansion of the application range of fluororesins.

The invention has been described in detail with particular reference to preferred embodiments, but it will be understood that variations and modifications can be effected within the scope of the invention as set forth in the appended claims.

What is claimed is:

1. A modified fluororesin comprising: a crosslinked fluororesin produced by exposing a fluororesin at a temperature at or above the melting point of the resin to an ionizing radiation to crosslink the fluororesin; and a functional group-containing organic compound which has been grafted onto the crosslinked fluororesin by ionizing radiation irradiation.

2. The modified fluororesin according to claim 1, wherein the functional group-containing organic compound is at least one organic compound having an ion-exchange functional group.

3. The modified fluororesin according to claim 2, wherein the organic compound having an ion-exchange functional group is selected from the group consisting of hydroxystyrene, acyloxystyrene, acrylic ester, methacrylic ester, maleic ester, fumaric ester, vinyl ester, a vinylamine compound, vinylpyridine, vinylsuccinimide, and vinylsulfonic ester.

4. The modified fluororesin according to claim 1, wherein the functional group-containing organic compound is at least one organic compound having a hydrophilic functional group.

5. The modified fluororesin according to claim 4, wherein the organic compound having a hydrophilic functional group is selected from the group consisting of hydroxystyrene, 2-hydroxymethyl methacrylate, 2-hydroxyethyl methacrylate, a vinylamine compound, vinylsuccinimide, vinylsulfonic acid, and vinyl alcohol.

6. The modified fluororesin according to claim 1, wherein the functional group-containing organic compound is at least one organic compound having an adhesive functional group.

7. The modified fluororesin according to claim 6, wherein the organic compound having an adhesive functional group is selected from the group consisting of glycidyl acrylate, glycidyl methacrylate, allyl glycidyl ether, vinyl-containing carbamic ester, and acrylonitrile.

8. The modified fluororesin according to claim 1, wherein the functional group-containing organic compound is at least one organic compound having an abrasion-resistant functional group.

9. The modified fluororesin according to claim 8, wherein the organic compound having an abrasion-resistant functional group is selected from the group consisting of vinylsiloxane, chlorotrifluoroethylene, vinyl chloride, vinylidene chloride, fluorostyrene, and chlorostyrene.

10. The modified fluororesin according to claim 1, wherein the fluororesin is at least one member selected from the group consisting of tetrafluoroethylene polymers, tetrafluoroethylene-perfluoro(alkyl vinyl ether) copolymers and tetrafluoroethylene-hexafluoropropylene copolymers.

11. A process for producing a modified fluororesin, comprising the steps of: exposing a fluororesin heated at a temperature at or above the melting point of the resin in an inert gas atmosphere having an oxygen concentration of not more than 10 Torr to an ionizing radiation at a radiation dose of 0.1 kGy to 10 MGy to prepare a crosslinked fluororesin; exposing the crosslinked fluororesin to an ionizing radiation at a radiation dose of 10 kGy to 5 MGy; and then bringing the crosslinked fluororesin into contact with a functional group-containing organic compound to cause a graft reaction.

12. The process according to claim 11, wherein, after the crosslinked fluororesin is exposed to the ionizing radiation, the crosslinked fluororesin is brought into contact with the functional group-containing organic compound in vacuo or in an inert gas.

13. A process for producing a modified fluororesin, comprising the steps of: exposing a fluororesin heated at a temperature at or above the melting point of the resin in an inert gas atmosphere having an oxygen concentration of not more than 10 Torr to an ionizing radiation at a radiation dose of 0.1 kGy to 10 MGy to prepare a crosslinked fluororesin; and exposing the crosslinked fluororesin to an ionizing radiation at a radiation dose of 10 kGy to 5 MGy in the presence of a functional group-containing organic compound to cause a graft reaction.

14. The process according to claim 13, wherein the functional group-containing organic compound is an organic compound having an ion-exchange functional group, an organic compound having a hydrophilic functional group, an organic compound having an adhesive functional group, or an organic compound having an abrasion-resistant functional group.

15. The process according to claim 13, wherein the functional group containing organic compound is selected from the group consisting of hydroxystyrene, acyloxystyrene, acrylic ester, methacrylic ester, maleic ester, fumaric ester, vinyl ester a vinylamine compound, vinylpyridine, vinylsuccinimide, vinylsulfonic ester, 2-hydroxymethyl methacrylate, 2-hydroxyethyl methacrylate, vinylsulfonic acid, vinyl alcohol, glycidyl acrylate, glycidyl methacrylate, allyl glycidyl ether, vinyl-containing carbamic ester, acrylonitrile, vinylsiloxane, chlorotrifluoroethylene, vinyl chloride, vinylidene chloride, fluorostyrene, and chlorostyrene.

16. The process according to claim 11, wherein the functional group-containing organic compound is an organic compound having an ion-exchange functional group, an organic compound having a hydrophilic functional group, an organic compound having an adhesive functional group, or an organic compound having an abrasion-resistant functional group.

17. The process according to claim 11, wherein the functional group containing organic compound is selected from the group consisting of hydroxystyrene, acyloxystyrene, acrylic ester, methacrylic ester, maleic ester, fumaric ester, vinyl ester, a vinylamine compound, vinylpyridine, vinylsuccinimide, vinylsulfonic ester, 2-hydroxymethyl methacrylate, 2-hydroxyethyl methacrylate, vinylsulfonic acid, vinyl alcohol, glycidyl acrylate, glycidyl methacrylate, allyl glycidyl ether, vinyl-containing carbamic ester, acrylonitrile, vinylsiloxane, chlorotrifluoroethylene, vinyl chloride, vinylidene chloride, fluorostyrene, and chlorostyrene.

18. The modified fluororesin according to claim 1, wherein the functional group-containing organic compound is an organic compound having an ion-exchange functional group, an organic compound having a hydrophilic functional group, an organic compound having an adhesive functional group, or an organic compound having an abrasion-resistant functional group.

19. The modified fluororesin according to claim 1, wherein the functional group containing organic compound is selected from the group consisting of hydroxystyrene, acyloxystyrene, acrylic ester, methacrylic ester, maleic ester, fumaric ester, vinyl ester, a vinylamine compound, vinylpyridine, vinylsuccinimide, vinylsulfonic ester, 2-hydroxymethyl methacrylate, 2-hydroxyethyl methacrylate, vinylsulfonic acid, vinyl alcohol, glycidyl acrylate, glycidyl methacrylate, allyl glycidyl ether, vinyl-containing carbamic ester, acrylonitrile, vinylsiloxane, chlorotrifluoroethylene, vinyl chloride, vinylidene chloride, fluorostyrene, and chlorostyrene.

* * * * *